United States Patent

(10) Patent No.: US 12,373,250 B2
(45) Date of Patent: Jul. 29, 2025

Agrawal et al.

(54) ENHANCING BATCH PREDICTIONS BY LOCALIZING JOBS CONTRIBUTING TO TIME DEVIATION AND GENERATING FIX RECOMMENDATIONS

(71) Applicant: Tata Consultancy Services Limited, Mumbai (IN)

(72) Inventors: Parag Agrawal, Pune (IN); Vikrant Vikas Shimpi, Pune (IN); Neha Behl, Pune (IN); Maitreya Natu, Pune (IN); Priyadarshi Rai, Pune (IN); Deepa Vaidyanathan, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 519 days.

(21) Appl. No.: 18/054,688

(22) Filed: Nov. 11, 2022

(65) Prior Publication Data

US 2023/0176906 A1 Jun. 8, 2023

(30) Foreign Application Priority Data

Dec. 6, 2021 (IN) .............................. 202121056599

(51) Int. Cl.
*G06F 9/48* (2006.01)
*G06Q 10/0631* (2023.01)

(52) U.S. Cl.
CPC ..... *G06F 9/4881* (2013.01); *G06Q 10/06316* (2013.01)

(58) Field of Classification Search
CPC .................. G06F 9/4881; G06Q 10/06316
See application file for complete search history.

(56) References Cited

U.S. PATENT DOCUMENTS 10,810,046 B2 10/2020 Patel et al.
2019/0050262 A1* 2/2019 Patel .......................... G06F 9/46
2021/0303381 A1* 9/2021 Baldassarre ............. G06N 5/04

OTHER PUBLICATIONS

Patel, Alok et al., "SLA Non-compliance Detection and Prevention in Batch Jobs", 20th International Conference on Enterprise Information Systems, Date: 2018, Publisher: Research Gate, https://www.scitepress.org/papers/2018/66739/66739.pdf.

(Continued)

*Primary Examiner* — Wissam Rashid
(74) *Attorney, Agent, or Firm* — Finnegan, Henderson, Farabow, Garrett & Dunner, LLP

(57) ABSTRACT

Data inaccuracy and insufficiency are critical aspects to be analyzed to improve batch predictions, specifically in context of SLA jobs as they are foremost in affecting deliverables. Embodiments of the present disclosure provide a method and system for enhancing batch predictions by localizing jobs contributing to time deviation and generating fix recommendations by fixing data inaccuracy and insufficiency. The term fix recommendation refers to recommending a list of plausible fixes to identified causes that reduce batch prediction errors enhancing accuracy of predictions. The localization is performed by bottom-up traversing of a batch graph representing a batch process, if the batch process has a Service level Agreement (SLA) job, by narrowing down to the SLA job that has end time inaccuracies. The localization enables identifying the origin or real contributors and root cause analysis is performed for the localized jobs to generate effective fix recommendations by fixing data inaccuracy and insufficiency.

9 Claims, 9 Drawing Sheets

(56) References Cited

OTHER PUBLICATIONS

Patel, Alok et al., "VisiTrac: Batch Analysis & Tracking Basic & Real-Time", VisiTrac : Batch Analysis & Tracking Basic & Real-Time, Publisher: SEA, https://seasoft.com/assets/seasoft.com/public/uploads/broschuere/48/VISITRAC_Brochure.pdf.

* cited by examiner

200

202 — generating, a batch graph corresponding to a batch process from among a plurality of batch processes, wherein the batch graph represents complex dependencies of a plurality of jobs in the batch using a plurality of nodes depicting parent-child relationship among the plurality of nodes, and wherein the batch graph captures precedence, schedule, time triggers, a predicted start time, a predicted run time, a predicted end time, an actual start time, an actual run time, and an actual end time of each of the plurality of jobs

204 — detecting presence of a Service Level Agreement (SLA) job in the plurality of jobs of the batch process represented by the batch graph, wherein the SLA job represent a child node

206 — determining on detecting presence of the SLA job in the batch process, whether the detected SLA job has an end time inaccuracy, wherein the end time inaccuracy is computed from the predicted end time and the actual end time of the SLA job (A)

FIG. 2A

ENHANCING BATCH PREDICTIONS BY LOCALIZING JOBS CONTRIBUTING TO TIME DEVIATION AND GENERATING FIX RECOMMENDATIONS

This U.S. patent application claims priority under 35 U.S.C. § 119 to: Indian Patent Application No. 202121056599, filed on Dec. 6, 2021. The entire contents of the aforementioned application are incorporated herein by reference.

TECHNICAL FIELD

The embodiments herein generally relate to field of batch predictions and, more particularly, to a method and system for enhancing accuracy of batch predictions by localizing jobs contributing to time deviation of batch process and generating fix recommendations.

BACKGROUND

Batch systems empower several industry verticals by doing data-driven heavy weight computations. For example (i) Banking and Financial industry use it to perform complex end-of-day operations such as processing credit card transactions ledger, debit card transactions ledgers, service requests, etc., (ii) Retail industry use it for planning next day sale by processing inventory management, store order management, etc., and (iii) Insurance industry use it for processing and approving claim requests, calculating premiums, calculating, and crediting commission for underwriters, etc. Batch processes are defined through a network of batch jobs (programs). These programs are usually noninteractive in nature and run in a batch mode. A batch process is defined through constructs comprising job precedence, job schedule, and time-triggers for the jobs. A) Job precedence: Job are inter-dependent on one-another and have a precedence relationship associated to them. They have constraints such as AND, OR, NOT, etc. defined on them which ensure that a job cannot execute until all its predecessor jobs have executed successfully. B) Job schedule: Jobs have schedules defined on them which define the days on which it they run. These could be simple schedules such as day of week, day of month, etc., or complex schedules such as first working day of month, last day of month, first day of quarter, specific days of year, etc. C) Time-triggers for the jobs: Jobs can have time-triggers defined on them that put a constraint that it cannot start before the defined time trigger value.

Batch schedulers use these constructs to orchestrate batch executions. They factor in the job precedence, job schedules, and time-triggers to chain different jobs together and transform them collectively in the form of a process that performs a defined business operation. However, batch processes tend to observe very large volumes of jobs (hundreds of thousands of jobs), and complex interdependencies (millions of edges). For example, the batch system of a big retailer consists of 20,000+ jobs and 30,000+ dependencies cutting across different lines of businesses. As a result, these existing batch processing systems lack end-to-end transparency and hence it is challenging to estimate impact of a failure or delay. This leads to unexpected delays and outages and inherently reactive operations. Industry is moving from reactive to proactive batch operations, wherein historical data and metadata are used to predict future/subsequent executions and generate early warnings. However, these existing predictive solutions rely on an assumption of availability of complete, consistent, and recent data. Data veracity has direct impact on the prediction accuracy and lookahead. This problem can be addressed in different ways. One existing approach is to make the prediction algorithms robust to data gaps and inconsistencies. Other work proposed addressing this problem at the origin itself to compute a data quality index and highlight areas that need attention. While these are promising directions but they either have variable degree of effectiveness, or they end-up requiring very large volume of manual effort. Both are usually unacceptable in the production-quality deployment of a product. As a result, the predictive approaches have a limited adoption and trust in the batch operations teams.

Knowledge of batch predictions specifying start time, run time, end time of jobs in a batch process enables better planning of deliverable and commitments, specifically when batch process includes Service Level Agreement (SLA) jobs. Reducing time deviation in the SLA job helps to accurately predict SLA state and take corrective actions ahead of time in case of potential misses. Any deviation in predicted times of any job in real time, affects the batch process performance, and creates severe impact on organization's deliverables or commitments if the batch process includes SLA job. The complex nature of batch process with complex interdependencies among the jobs introduce a ripple effect of prediction error or time deviation occurred in any of the jobs. Further, unexpected challenges encountered during execution or run time adds on to theses prediction errors. Thus, enhancing prediction accuracy to bring down prediction errors to minimal without manual intervention is an open problem.

SUMMARY

Embodiments of the present disclosure present technological improvements as solutions to one or more of the above-mentioned technical problems recognized by the inventors in conventional systems.

For example, in one embodiment, a method for enhancing accuracy of batch predictions by localizing jobs contributing to time deviation of batch process and generating fix recommendations is provided. The method includes generating a batch graph corresponding to a batch process from among a plurality of batch processes, wherein the batch graph represents complex inter-dependencies of a plurality of jobs in the batch process using a plurality of nodes depicting parent-child relationship among the plurality of nodes. The batch graph captures precedence, schedule, time triggers, a predicted start time, a predicted run time, a predicted end time, an actual start time, an actual run time, and an actual end time of each of the plurality of jobs. Further the method includes detecting presence of a Service Level Agreement (SLA) job in the plurality of jobs of the batch process represented by the batch graph, wherein the SLA job is identified as a child node. Further the method includes determining, on detecting presence of the SLA job in the batch process, whether the detected SLA job has an end time inaccuracy. The end time inaccuracy is computed from the predicted end time and the actual end time of the SLA job. Furthermore the method includes applying an iterative bottom-up traversing approach on the batch graph from the child node representing the SLA job to detect one or more parent nodes among a plurality parent nodes of the child node at each successive level among a plurality of successive levels of the batch graph, wherein the detected one or more parent nodes at each successive level have a time deviation introducing an end time error as a result of difference between the actual end time and the predicted end time, and wherein the iterative bottom-up traversing approach terminates on detection at least one of, a) a parent node among the one or more parent nodes is a root node of the batch graph and b) a job corresponding to a higher level parent node of the detected one or more parent nodes is having a zero time deviation. Furthermore the method includes localizing one or more jobs associated with one or more nodes from among the one or more parent nodes at each of the successive levels having the end time error greater than a maximum end time error aggregated for the one or more parent nodes at each successive level. Furthermore, the method includes performing a root cause analysis of the localized one or more jobs for batch predictions by determining causes of the time deviation by classifying the localized one or more jobs based the on a plurality of conditions comprising a positive start time error, a negative start time error and a run time error. The plurality of conditions are defined as a combination of at least one of the predicted start time, the predicted run time, the actual start time, and the actual run time, and wherein the root cause analysis identifies data inaccuracy and insufficiency in a dataset of the batch processing execution environment. Thereafter, the method includes generating fix recommendations providing a list of plausible fixes for each of the localized one or more jobs based on the root cause analysis to eliminate the time deviation by fixing the data inaccuracy and insufficiency and enhancing the batch predictions for future or subsequent executions of the plurality of batch processes.

In another aspect, a system for enhancing accuracy of batch predictions by localizing jobs contributing to time deviation of batch process and generating fix recommendations is provided. The system comprises a memory storing instructions; one or more Input/Output (I/O) interfaces; and one or more hardware processors coupled to the memory via the one or more I/O interfaces, wherein the one or more hardware processors are configured by the instructions to generate a batch graph corresponding to a batch process from among a plurality of batch processes, wherein the batch graph represents complex inter-dependencies of a plurality of jobs in the batch process using a plurality of nodes depicting parent-child relationship among the plurality of nodes. The batch graph captures precedence, schedule, time triggers, a predicted start time, a predicted run time, a predicted end time, an actual start time, an actual run time, and an actual end time of each of the plurality of jobs. Further the system is configured to detect presence of a Service Level Agreement (SLA) job in the plurality of jobs of the batch process represented by the batch graph, wherein the SLA job is identified as a child node. Further the system is configured to determine, on detecting presence of the SLA job in the batch process, whether the detected SLA job has an end time inaccuracy. The end time inaccuracy is computed from the predicted end time and the actual end time of the SLA job. Furthermore the system is configured to apply an iterative bottom-up traversing approach on the batch graph from the child node representing the SLA job to detect one or more parent nodes among a plurality parent nodes of the child node at each successive level among a plurality of successive levels of the batch graph, wherein the detected one or more parent nodes at each successive level have a time deviation introducing an end time error as a result of difference between the actual end time and the predicted end time, and wherein the iterative bottom-up traversing approach terminates on detection at least one of, a) a parent node among the one or more parent nodes is a root node of the batch graph and b) a job corresponding to a higher level parent node of the detected one or more parent nodes is having a zero time deviation. Furthermore the system is configured to localize one or more jobs associated with one or more nodes from among the one or more parent nodes at each of the successive levels having the end time error greater than a maximum end time error aggregated for the one or more parent nodes at each successive level. Further the system is configured to perform a root cause analysis of the localized one or more jobs for batch predictions by determining causes of the time deviation by classifying the localized one or more jobs based the on a plurality of conditions comprising a positive start time error, a negative start time error and a run time error. The plurality of conditions are defined as a combination of at least one of the predicted start time, the predicted run time, the actual start time, and the actual run time, and wherein the root cause analysis identifies data inaccuracy and insufficiency in a dataset of the batch processing execution environment. Thereafter, the system is configured to generate fix recommendations providing a list of plausible fixes for each of the localized one or more jobs based on the root cause analysis to eliminate the time deviation by fixing the data inaccuracy and insufficiency and enhancing the batch predictions for future or subsequent executions of the plurality of batch processes.

In yet another aspect, there are provided one or more non-transitory machine-readable information storage mediums comprising one or more instructions, which when executed by one or more hardware processors causes a method for enhancing accuracy of batch predictions by localizing jobs contributing to time deviation of batch process and generating fix recommendations. The method includes generating a batch graph corresponding to a batch process from among a plurality of batch processes, wherein the batch graph represents complex inter-dependencies of a plurality of jobs in the batch process using a plurality of nodes depicting parent-child relationship among the plurality of nodes. The batch graph captures precedence, schedule, time triggers, a predicted start time, a predicted run time, a predicted end time, an actual start time, an actual run time, and an actual end time of each of the plurality of jobs. Further the method includes detecting presence of a Service Level Agreement (SLA) job in the plurality of jobs of the batch process represented by the batch graph, wherein the SLA job is identified as a child node. Further the method includes determining, on detecting presence of the SLA job in the batch process, whether the detected SLA job has an end time inaccuracy. The end time inaccuracy is computed from the predicted end time and the actual end time of the SLA job. Furthermore the method includes applying an iterative bottom-up traversing approach on the batch graph from the child node representing the SLA job to detect one or more parent nodes among a plurality parent nodes of the child node at each successive level among a plurality of successive levels of the batch graph, wherein the detected one or more parent nodes at each successive level have a time deviation introducing an end time error as a result of difference between the actual end time and the predicted end time, and wherein the iterative bottom-up traversing approach terminates on detection at least one of, a) a parent node among the one or more parent nodes is a root node of the batch graph and b) a job corresponding to a higher level parent node of the detected one or more parent nodes is having a zero time deviation. Furthermore the method includes localizing one or more jobs associated with one or more nodes from among the one or more parent nodes at each of the successive levels having the end time error greater than a maximum end time error aggregated for the one or more parent nodes at each successive level. Furthermore, the method includes performing a root cause analysis of the localized one or more jobs for batch predictions by determining causes of the time deviation by classifying the localized one or more jobs based the on a plurality of conditions comprising a positive start time error, a negative start time error and a run time error. The plurality of conditions are defined as a combination of at least one of the predicted start time, the predicted run time, the actual start time, and the actual run time, and wherein the root cause analysis identifies data inaccuracy and insufficiency in a dataset of the batch processing execution environment. Thereafter, the method includes generating fix recommendations providing a list of plausible fixes for each of the localized one or more jobs based on the root cause analysis to eliminate the time deviation by fixing the data inaccuracy and insufficiency and enhancing the batch predictions for future or subsequent executions of the plurality of batch processes.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2A and FIG. 2B (collectively referred as FIG. 2) is a flow diagram illustrating a method for enhancing accuracy of batch predictions by localizing jobs contributing to time deviation and generating fix recommendations, using the system of FIG. 1, in accordance with some embodiments of the present disclosure.

DETAILED DESCRIPTION

Figure 1:
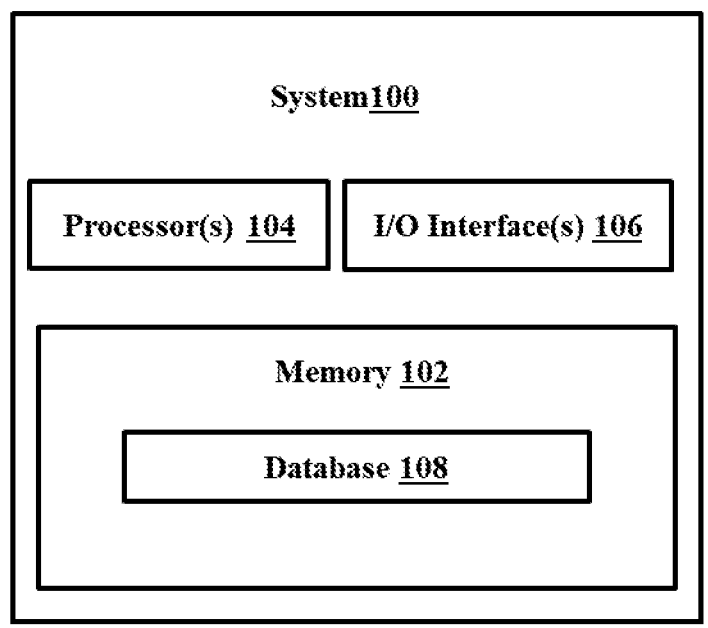
FIG. 1 is a functional block diagram of a system for enhancing accuracy of batch predictions by localizing jobs contributing to a time deviation and generating fix recommendations, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments of the present disclosure provide a method and system for enhancing batch predictions by localizing jobs contributing to time deviation and generating fix recommendations by fixing data inaccuracy and insufficiency. The term fix recommendation refers to recommending a list of plausible fixes to identified causes that reduce batch prediction errors enhancing accuracy of predictions. The localization is performed by bottom-up traversing of a batch graph representing a batch process, if the batch process has a Service level Agreement (SLA) job, by narrowing down to the SLA job that has end time inaccuracies. The localization enables identifying the origin or real contributors, and a root cause analysis is performed for the localized jobs to generate fix recommendations.

The method disclosed eliminates manual intervention by complete automation of localization, root cause analysis and generating recommendation for the only most critical jobs (the SLA jobs) that show end time inaccuracy. The generated recommendation are effective to provide enhanced batch predictions for future execution of batch processes by fixing data inaccuracy and insufficiency.

Referring now to the drawings, and more particularly to FIGS. 1 through 5D, where similar reference characters denote corresponding features consistently throughout the figures, there are shown preferred embodiments and these embodiments are described in the context of the following exemplary system and/or method.

FIG. 1 is a functional block diagram of a system 100, for enhancing batch predictions by localizing jobs contributing to time deviation and generating fix recommendations, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that stores the batch graphs of a plurality of batch processes of an organization, the localized jobs and corresponding fix recommendations generated for the localized jobs the like. Further, may include a rule engine (not shown) for performing root cause analysis and generation the plausible list of fixes. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Functions of the components of the system 100 are explained in conjunction with flow diagram of FIG. 2 and examples depicted in FIGS. 3 though 5D.

Figure 2B:
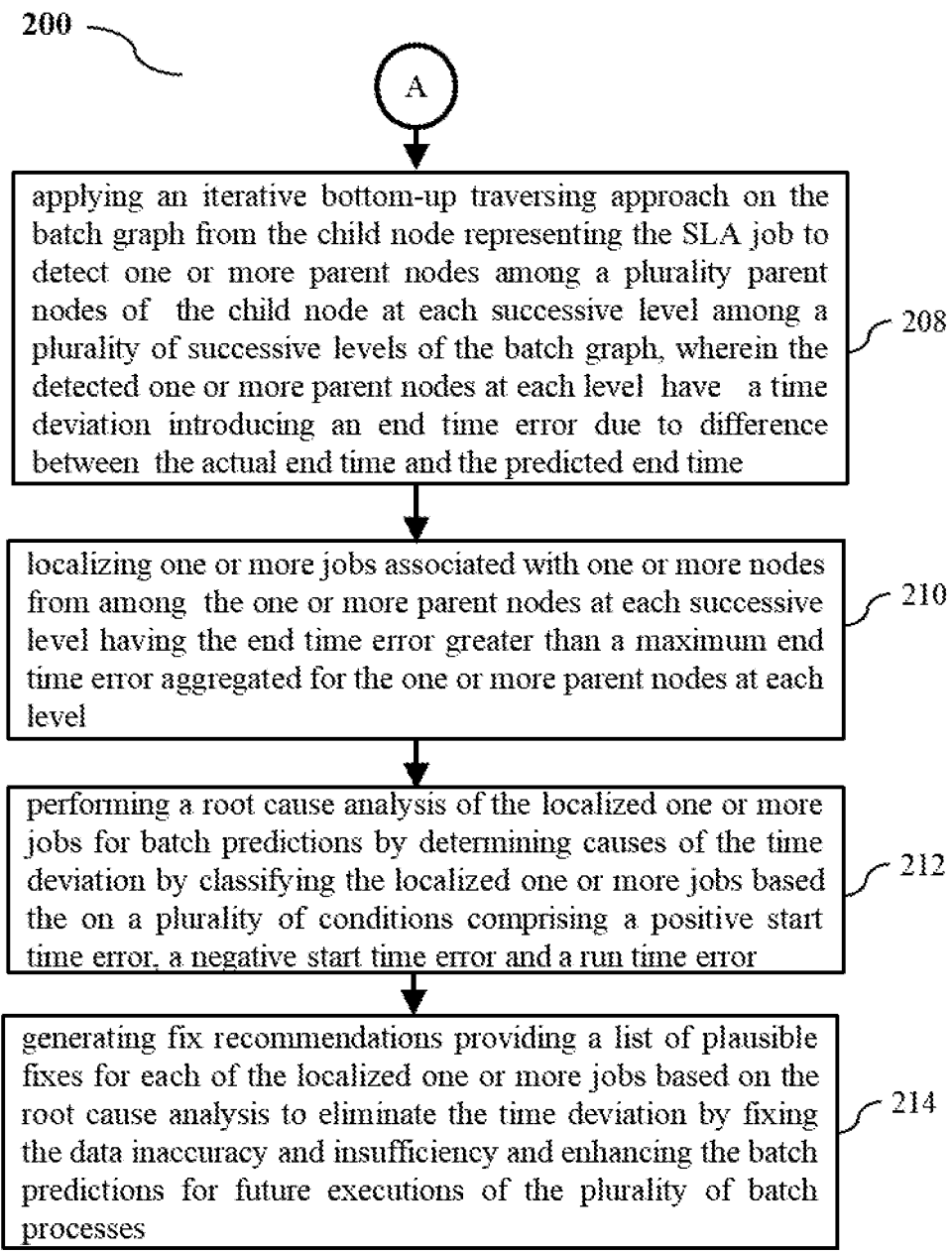

FIG. 2A and FIG. 2B (collectively referred as FIG. 2) is a flow diagram illustrating a method 200 for enhancing batch predictions by localizing jobs contributing to time deviation of the SLA job and generating fix recommendations, using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 3:
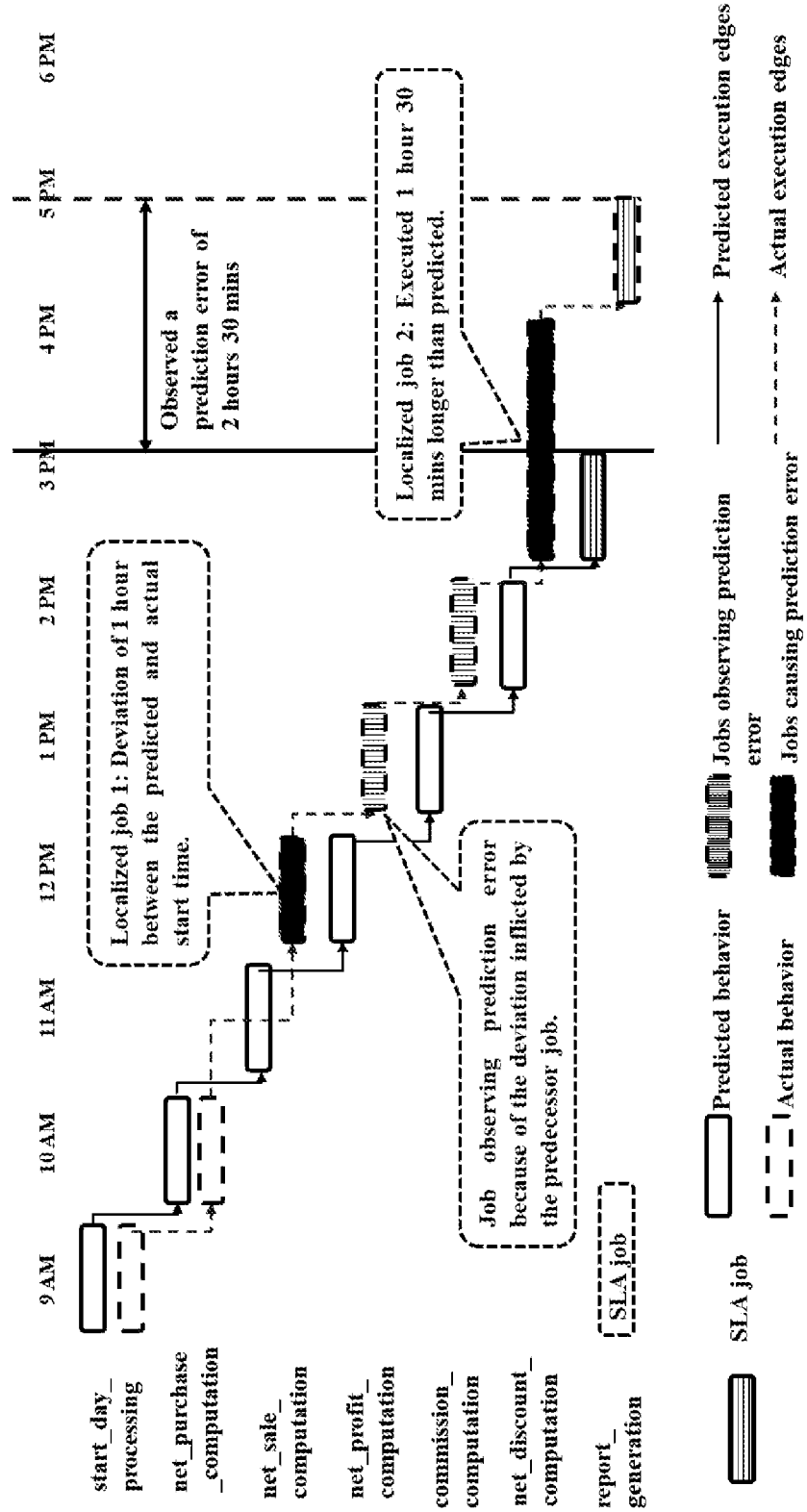
FIG. 3 is an example batch graph of a batch process comprising jobs that have linear precedence relationship, wherein the jobs are analyzed by the system of FIG. 1 for localizing jobs of the batch process that contribute to the time deviation of a Service Level Agreement (SLA) job, in accordance with some embodiments of the present disclosure.

The steps of the method 200 are better understood with conjunction to FIG. 3, wherein the FIG. 3 is an example batch graph of a batch process comprising jobs that have linear precedence relationship, which are analyzed by the system of FIG. 1 for localizing jobs contributing to time deviation of a SLA job, in accordance with some embodiments of the present disclosure.

Concepts disclosed by the method 100 are better understood based on design rationale described below and explained in conjunction with FIG. 3.

Terms

1. Job x: refers to batch job x
2. ST(x), RT(x), ET(x): refer to start-time, run-time, and end time of Job x respectively
3. Parent(x): refers to the set of jobs that are immediate parents of Job x. Job x can execute only after all jobs in Parent(x) have successfully completed. Jobs with no parent jobs are referred to as root jobs.
4. Child(x): refers to the set of jobs that are immediate children of Job x. Job x must complete before any of the jobs in Child(x) can execute. Jobs with no child jobs are referred to as leaf jobs.
5. Schedule (x): refers to the calendar days when a job is scheduled to execute.
6. Time-trigger (x): refers to a start-time constraint on a job. It refers to a time before which a job cannot be scheduled to run. Time-trigger is often defined on few jobs based on the business logic.
7. SLA-Job x: refers to the Job x on which a Service Level Agreement (SLA) is defined. This SLA is defined on end time of which and usually an indicative of a business requirements of the time by when the job must finish execution. SLAs are usually defined on very few jobs and are usually the end-jobs of a business process indicating successful completion of the process.

As depicted in FIG. 3 the batch process comprises 7 jobs that have a linear precedence relationship. The batch process is predicted to execute for 7 hours starting at 9 AM and ending by 4 PM. Now during the actual run following points are noted i. The first two jobs ran with a zero deviation from predictions.
ii. The third job started 1 hour late i.e. it started an hour after the completion of second job.
iii. From third job till sixth each job started 1 hour late due to the start-time deviation inflicted by the third job.
iv. The fifth job ran for a duration of 2 hours and 30 minutes against a predicted value of 1 hour thus, inflicting cumulative error of 2 hours and 30 minutes on the sixth job.
v. The seventh job started with a start-time error of 2 hours and 30 minutes and ends with the same error.

Manifestation of prediction error: The most prominent manifestation of prediction error is the form of incorrectly predicting an SLA violation (a false positive or a false negative). This manifestation is because of difference in a predicted end time and an actual end time of the SLA job. This difference in turn is a cumulative effect of prediction errors in the SLA job and the upstream jobs. End time of one or more upstream jobs is predicted incorrectly, and this leads to a ripple effect in the prediction error in the downstream jobs and the SLA job. While prediction errors manifest in end time, the predictions can go wrong due to 2 main reasons: 1) predicted start times of these jobs are not predicted correctly 2) predicted run times of these jobs are not predicted correctly. Analysis indicates both start times and run time error usually have very different set of causes and fixes.

Reasons for incorrectly predicted run-times: Causes of the prediction errors in the predicted run time of a job are mostly found within the job's historical data itself. Most of these are data or modeling issues.

One of most common reasons of incorrectly predicted run time is the data quality. The historical data that is used to create forecasting models is either too less, or too old. A correction to that usually entails getting more and recent historical data about the job.

Another common reason is that the forecasting models are inadequate. This usually is a result of insufficient data preparation, feature engineering, over or under-fitting the model, or making the model too simplistic or too complicated. A correction in this usually entails revisiting the model creation.

In some cases, the nature of the job is such that it is inherently unpredictable. Such cases often cannot be corrected.

In some cases, all other factors are in place, but the prediction error occurs only because an anomaly occurred in the execution of that specific day. Such cases can be addressed by adapting predictions on observing such anomalies in real-time.

Reasons for incorrectness in the predicted start time: Causes of prediction errors in start time are often explained by errors related to the upstream jobs.

A common cause of prediction error in start-time of a job is due to incorrect information of the dependencies to its parent jobs. False additional dependencies make the predicted start time greater than the actual start-time. Missing dependencies, on the other hand, make the predicted start time lesser than an actual start time. Correction to this case, involved correcting the dependency information.

Another case of prediction error in the predicted start-time is due to incorrect schedules of parent jobs. Schedule data helps decide if a particular is supposed to execute on a given day or not. A wrong or stale schedule information of parent jobs, can naturally lead to extra parent jobs, or missing parent jobs in the prediction engine. Extra incorrect parent jobs can make the predicted start time greater than the actual start time. Similarly, missing correct parent jobs can make the predicted start time smaller than the actual start time. Such cases can be corrected by correcting the schedule information.

Some causes of prediction errors in the predicted start time can also be due to the start-time properties of the job itself.

For cases where a job has a time-trigger defined on it, an incorrect or old time-trigger can lead to prediction errors. Note that time-trigger refers to the time-constraint before which a job cannot be scheduled to run. Such errors can be corrected by correcting the time-trigger information Concepts used by the method 200 for narrowing down the origins that are real contributors in introducing prediction errors: Identifying the origin refers to localizing the jobs contributing to time deviation of the SLA job. While predicting a batch, various batch specific constructs such as schedule, precedence, time-triggers, historical runs data of each job, etc. are used. Each batch job is decorated with $ST(x)$, $RT(x)$ and $ET(x)$. From prediction, following observations are noted 1. End time of a job is a function of its start time and run time $$ET(Ni)=ST(Ni)+RT(Ni) \quad (1)$$

2. Start time of a job is max of end time of its parents $$ST(Ni)=\max(ET(Parents(Ni))) \quad (2)$$

3. The prediction errors can be broadly classified into start time error, run time error, and end time error. Based on equation (1) that end time errors are also a function of start time errors and run time errors.

$$Error(ET(Ni))=Error(ST(Ni))+Error(RT(Ni)) \quad (3)$$

4. From equation (2), it is understood that the last ending parent node propagated down its end time error to the actual start time of the child node.

$$Error(ST(Ni))=f(Error(ET(Parents(Ni))) \quad (4)$$

5. Looking at equations (3) and (4), it can be inferred that errors in start time are a function of the error passed on by jobs corresponding to the parent nodes while end time error is a self-imparted error. Substituting value of Error $(ST(Ni))$ in equation (3) from equation (4).

$$Error(ET(Ni))=f(Error(ET(Parents(Ni))+Error(RT(Ni))) \quad (5)$$

The observations represented as equations 1 through 5 are utilized by the method 200 to find the problematic areas in the batch graph with the primary focus on end time errors based on equation (1). The method 200 enables fixing the end time prediction errors of only the SLA jobs, and not all the jobs observing end time prediction errors, as inaccuracies in predicting SLA jobs can lead to high penalties and business disruptions. Therefore, the method 200 focusses on localizing jobs that cause the SLA jobs to deviate and mark them as causes. While localizing it is ensured that an optimal number of root causes are identified and a pin-pointed recommendations to fix the cause with the intention to correct only SLA end time deviations is provided to end user. Thus, the method 200 only identifies and processes batch graphs with SLA jobs having end time inaccuracies. The reason being, SLA deviations are critical for organization level commitments and need to be resolved with top priority as compared to the other jobs reporting time deviations.

Referring now to the steps of the method 200, at step 202 of the method 200, the one or more hardware processors 104 generate a batch graph corresponding to a batch process from among a plurality of batch processes, wherein the batch graph represents complex inter-dependencies of a plurality of jobs in the batch process using a plurality of nodes depicting parent-child relationship among the plurality of nodes. The batch graph captures precedence, schedule, time triggers, a predicted start time, a predicted run time, a predicted end time, an actual start time, an actual run time, and an actual end time of each of the plurality of jobs.

Further, since only the SLA jobs are of interest for the reasons explained earlier, at step 204 of the method 200, the one or more hardware processors 104 detect presence of a SLA job in the plurality of jobs of the batch process represented by the batch graph, wherein the SLA job is identified as a child node.

At step 206 of the method 200, the one or more hardware processors 104 determine, on detecting presence of the SLA job in the batch process, whether the detected SLA job has an end time inaccuracy, wherein the end time inaccuracy is computed from the predicted end time and the actual end time of the SLA job.

Figure 4:
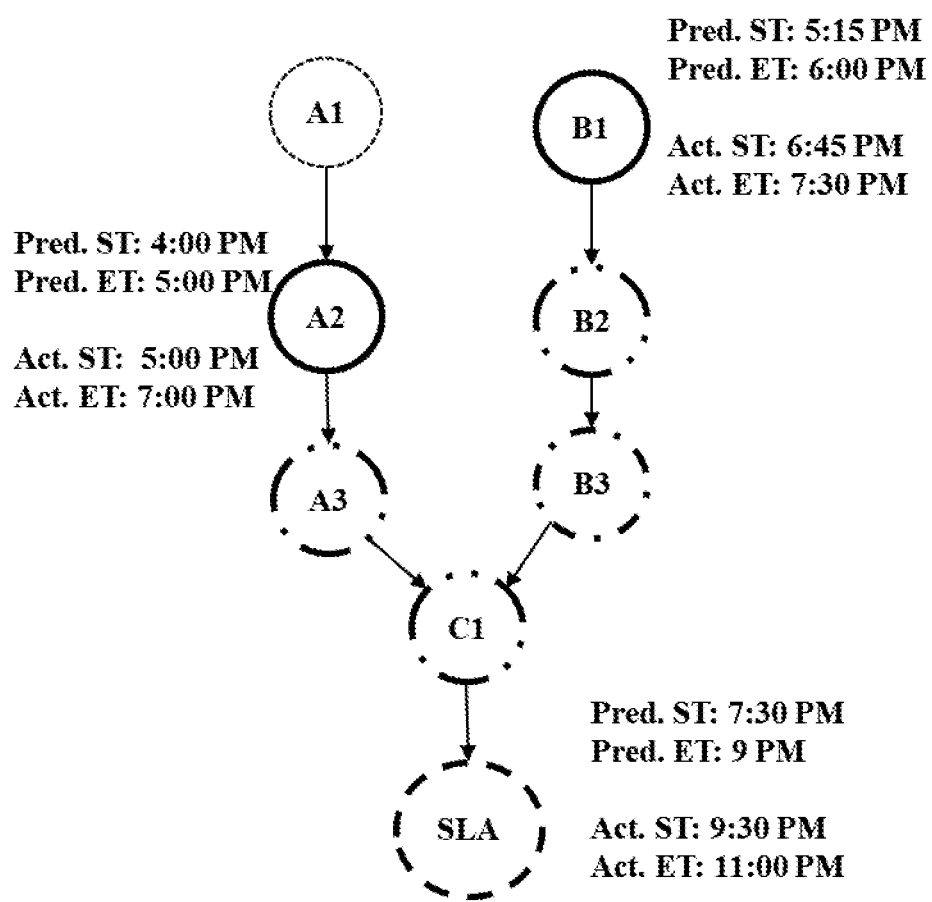
FIG. 4 is an example batch graph depicting time deviations in expected executions of one or more jobs, in accordance with some embodiments of the present disclosure.

At step 208 of the method 200, the one or more hardware processors 104 apply an iterative bottom-up traversing approach on the batch graph from the child node representing the SLA job to detect one or more parent nodes among a plurality parent nodes of the child node at each level among a plurality of successive levels of the batch graph. FIG. 4 depicts the parent nodes and successive levels. The detected one or more parent nodes at each successive level have a time deviation introducing an end time error due to difference between the actual end time and the predicted end time. The iterative bottom-up traversing approach terminates on detection at least one of, a) a parent node among the one or more parent nodes is a root node of the batch graph and b) a job corresponding to a higher level parent node of the detected one or more parent nodes is having a zero time deviation. The parent node detection is represented by equation 6 below based on end time errors experienced by the nodes.

$$ET(Parents(Ni))>ST(Ni)-error(ST(Ni)) \quad (6)$$

For example, in FIG. 4, the SLA job is observing end time prediction error of 2 hours. On traversing the upstream (bottom-up), it is identified that jobs with end time errors are (B2, B3, A2, A3, C1) and are the parent nodes at successive levels, while job with no prediction error (zero end time deviation) is (A1) is not identified as parent node in the path traversal. Further, traversing terminates at A1 ('zero' end time deviation on one path, while at B1 on other path, since B1 is a root node) as per the termination conditions listed above.

At step 210 of the method 200, the one or more hardware processors 104 localize one or more jobs associated with one or more nodes from among the one or more parent nodes at each of the successive levels having the end time error greater than a maximum end time error aggregated for the one or more parent nodes at each successive level. The end time error is difference between a corresponding predicted end time and corresponding actual end time of each of the one or more jobs and represented by equation 7 below:

$$Error(ET(Ni))>Error(ET(Parents(Ni))) \quad (7)$$

Figure 5A:
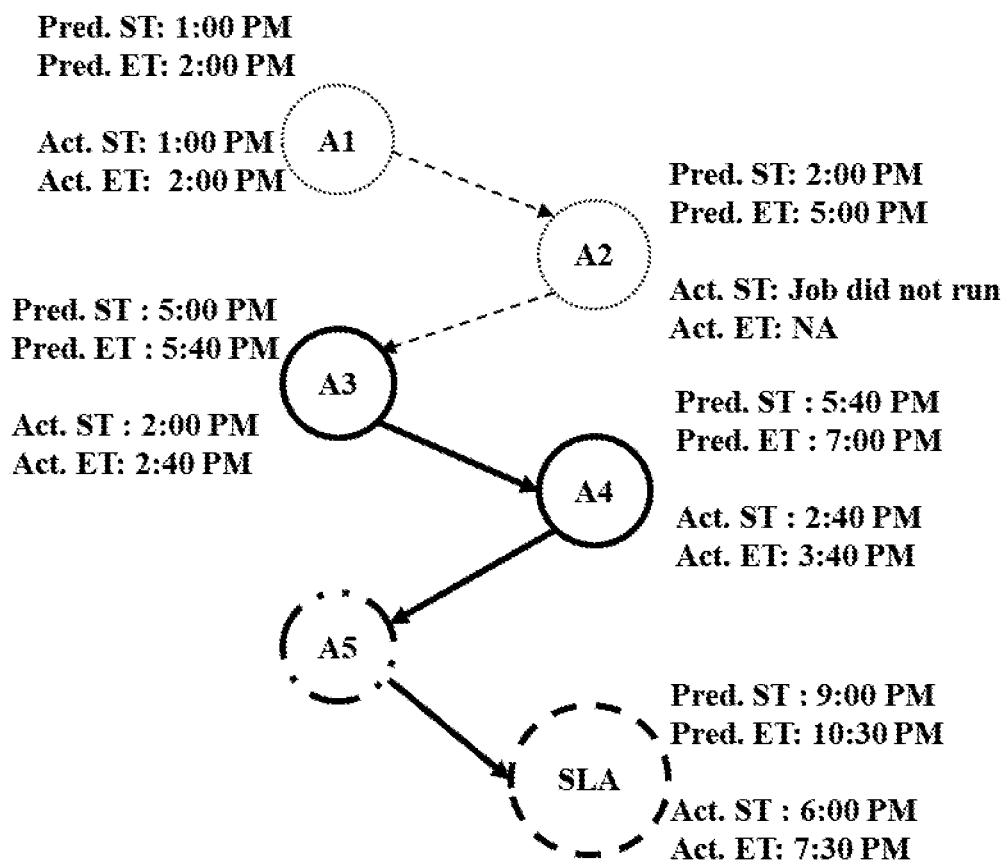
FIGS. 5A through 5D are example batch graphs indication various root causes contributing to time deviations in the SLA job and corresponding fix recommendations generated by the system of FIG. 1, in accordance with some embodiments of the present disclosure It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

As depicted in FIG. 5A, Jobs A3 and A4 are the localized jobs whose impact percolated down to the SLA job. A3 was expected to start at 5:00 PM, immediately after the end of its immediate parent job A2. But in reality, A2 did not run and A3 started at 2 PM, right after completion of A1. In addition to this Job A4 ran 20 minutes shorter.

Once the jobs are localized, at step 212 of the method 200, the one or more hardware processors 104 perform the root cause analysis of the localized jobs for batch predictions by determining causes of the time deviation by classifying the localized one or more jobs based the on a plurality of conditions. The plurality of conditions are derived from a positive start time error, a negative start time error and a run time error. The plurality of conditions are defined as a combination of at least one of the predicted start time, the predicted run time, the actual start time, and the actual run time, and wherein the root cause analysis identifies data inaccuracy and insufficiency in a dataset of the batch processing execution environment.

Root cause analysis (identifying the root cause): Jobs that are localized are highly inaccurate in end time predictions. From equation (3), it can be interpreted that this could be because of inaccuracies in either actual start time or actual runtime, which can further be classified by the system 100 into three cases or categories based on the plurality of conditions as stated below.

1. Start time (ST) error is positive i.e., predicted ST>actual ST: Predicted ST of a cause job essentially is derived using equation (2). In reality, the job may start earlier than expected, which can be primarily because of two reasons. The terms 'job' and 'node' are used interchangeably during explanation as a job is represented by a node (parent node or child node) in the batch graph.

a) Inaccuracies in parent schedules: The start-time of a job is predicted using equation (2) with a set of all parent jobs predicted to run on that day. Thus, the first step to predict a given day's batch is to mine schedules and find jobs that are expected to run on that day. If any or all of the parent jobs of a localized job do not run, then the schedule information of the parent jobs does not remain valid, thereby influencing the predictions by providing extra nodes in the parent set of that day.

b) Incorrect dependencies: If a localized job Ni ($i^{th}$ node) starts before completion of its parent jobs, it means that either the job Ni does not respect the precedence relationship, or the precedence relationship is invalid due to any change in the business environment. Such cases violate equation (2). Thus, all such edges where the child node starts before the completion of its parent jobs are invalid and should be removed.

2. ST error is negative i.e., predicted ST<actual ST: The localized job, in reality, might start later than expected, which can be primarily because of two reasons:

a) Missing dependencies: Batch processes, in some scenarios, are dependent on external processes or manual executions that execute between the localized job and its parents. These are not captured as precedence relationship by the modeled blueprint, because of which they lead to inaccuracies in predictions.

b) Incorrect schedules: In some scenarios, job that are not expected to run on a given day, might in reality run in between different jobs, causing a delay in the start of some jobs, often by ignoring the parent job set in equation (2). Such jobs are identified, and their schedules information are corrected upon validation.

3. Run Time (RT) error i.e. predicted RT≠Actual RT: RT of a job is predicted using forecasting models that take into consideration the historical executions. The prediction in run-time can be inaccurate because of the following reasons:

i. Data is too noisy or contains invalid records
  ii. Number of data points are very few or the data is too old
  iii. Change in the defined work-load model on the day under consideration, and
  iv. Anomalous execution of job.

Referring back to method 200, at step 214, the one or more hardware processors 104 generate fix recommendations based on the rule engine for each of the localized jobs based on the root cause analysis to eliminate the time deviation by fixing the data inaccuracy and insufficiency and enhancing the batch predictions for future or subsequent executions of the batch processes. Further, a multi objective optimization is applied to determine intensity of impact of each fix among the list of plausible fixes, wherein high intensity fixes are applied for future or subsequent batch predictions FIGS. 5A through 5D are example batch graphs indication various root causes contributing to time deviations in the SLA job and corresponding fix recommendations generated by the system of FIG. 1, in accordance with some embodiments of the present disclosure.

Recommending corrective actions: At step 210 the localized job are identified, and the root cause analysis is performed to determine the causes of prediction error (time deviation). The classification groups the localized jobs in defined categories. The method 200 provides an approach and a criteria to derive fixes to these problems and recommended corrective actions. This can be implemented using the rule engine. To derive appropriate recommendations, the ST error is analyzed as below.

For ST error, it is first verified if time-trigger can be predicted and defined them. To check its predicted, its historical start time is factored and deviation in it is mined. If the deviation is found to be high, it is considered as unpredictable, else in next step ST is predicted. Listed below are fix recommendation provided by the rule engine of the system 100 for each of the classes identified for the one or more localized jobs during the root cause analysis.

ST error positive (i.e., Predicted ST>Actual ST): These are cases where the localized job started earlier than expected.

A) Due to inaccuracies in parent schedules—the system 100 recommends correcting the schedules of such parent jobs which did not run. For example, in FIG. 5A, Job A3 is the localized job whose impact percolated down to the SLA job. A3 was expected to start at 5:00 PM, immediately after the end of its immediate parent job A2. But in reality, A2 did not run and A3 started at 2 PM, right after completion of A1. FIG. 5A indicates incorrect schedule defined for predecessor of localized job causing a prediction error of 3 hours and recommended to add correct schedule of parent job.

Figure 5B:
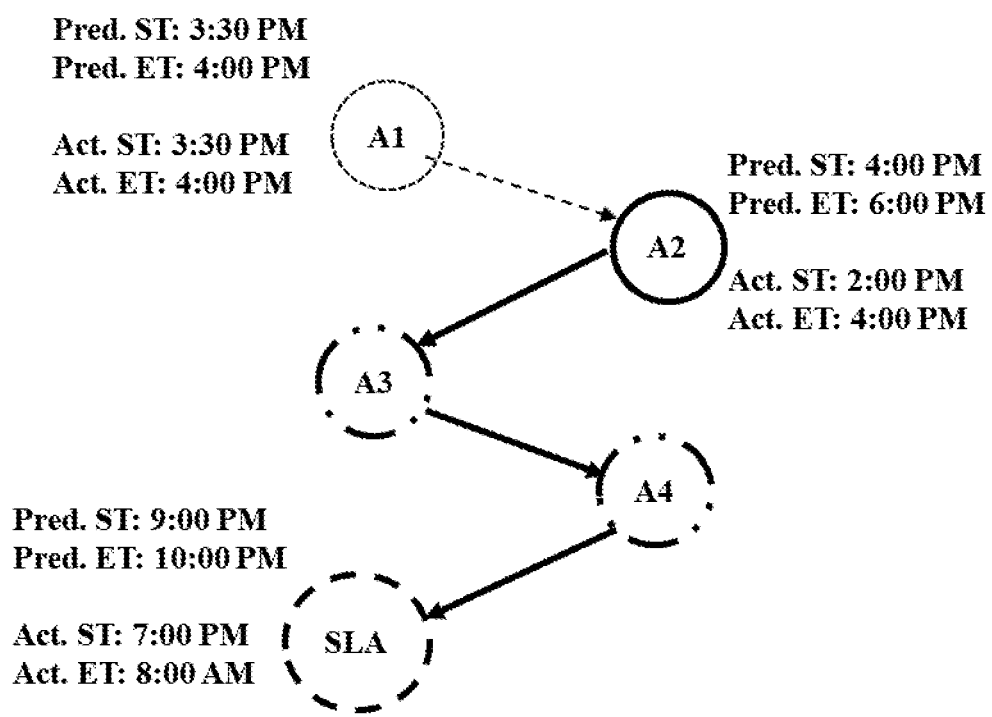

B) Due to presence of incorrect dependencies: The system 100 recommends removing all invalid precedence relationships between parent jobs and the localized job. For example, in FIG. 5B, Job A2 is the localized job which causing the SLA job to start 2 hours earlier than expected. A2 was predicted to start immediately after the completion of its parent job A1 at 4:00 PM. But in reality, it did not wait for its parent and started 2 hours earlier than the completion of its parent job. FIG. 5B indicates incorrect precedence relationship defined between localized job and its predecessor causing a prediction error of 2 hours and the system 100 recommends removing the edge between parent and child.

ST Error is negative i.e., Predicted ST<Actual ST: These are cases where the localized job starts later than expected.

Figure 5C:
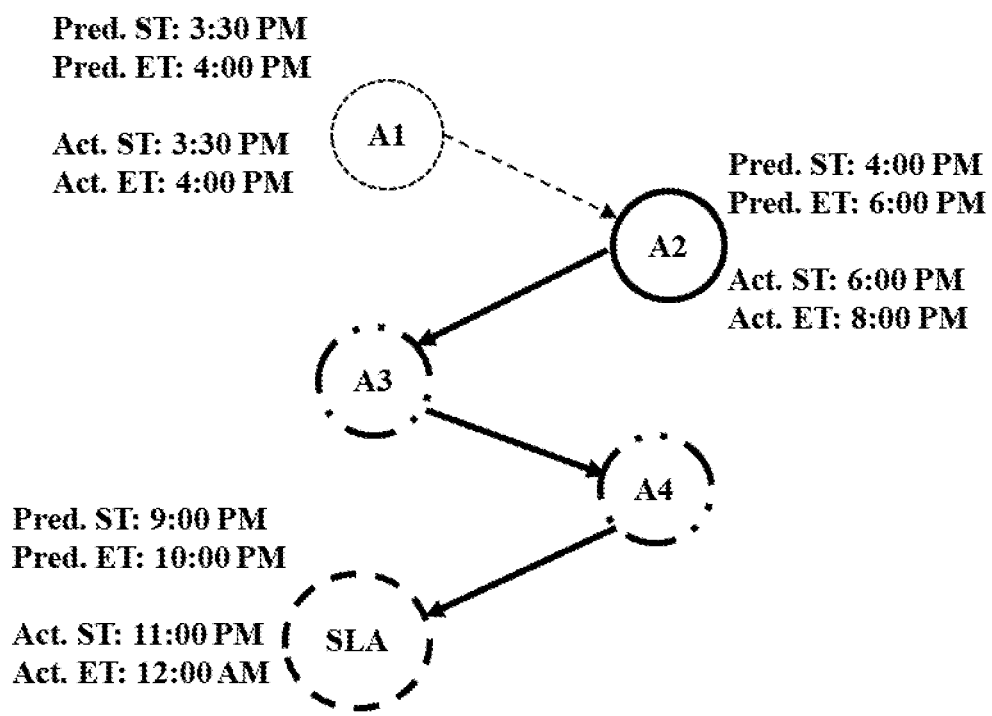
Figure 5D:
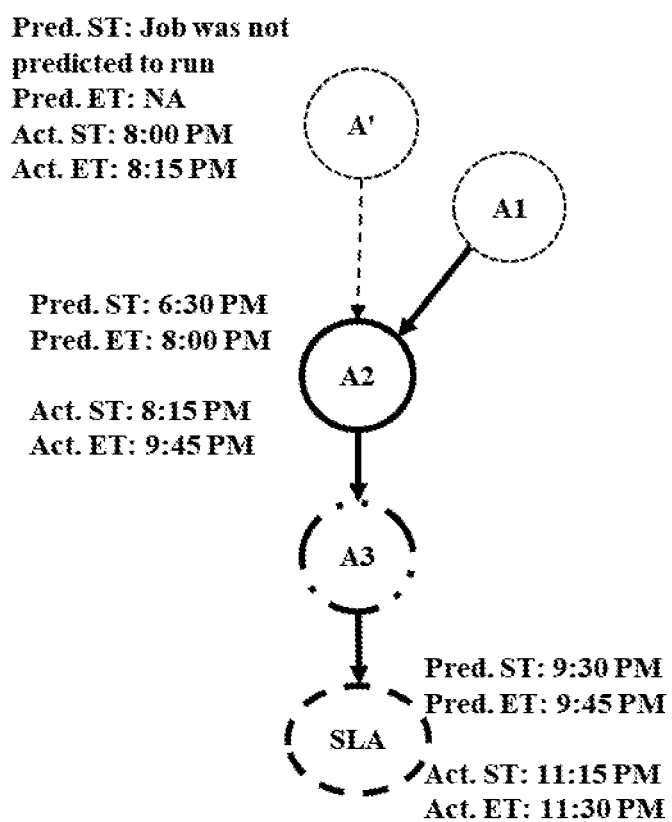

A) Due to missing dependencies: This is primarily observed when the existing dependencies are not defined in the blueprint and hence not taken into consideration for prediction. In such cases, the system 100 recommends identifying the missing precedence relationships and modeled, so that the start time of the localized job is correctly predicted. For example, in FIG. 5C job A2 started after a slack of 2 hours after its parent job A1 had completed instead of immediately starting at 6:00 PM. FIG. 5C indicates missing precedence relationship and no time-triggers defined between localized job and its predecessor causing a prediction error of 2 hours and the system 100 recommends to add the missing edges between the node and its predecessors.

B) Due to incorrect schedules: This is observed when extra jobs, which were not scheduled to run on a given day, run on that day thereby. Such jobs are identified and as a corrective measure, their schedule are recommended to be verified and updated. For example, in FIG. 5D job A2 was expected to run at 6:30 PM on the completion of its only parent job A1. But in reality, A2 waited for job A' which was not predicted to run on the given day, thus impacting the end time predictions. The FIG. 5D indicates incorrect schedule defined for predecessor of localized job causing a prediction error of 1 hour 45 minutes, where the system 100 recommends adding correct schedule of parent job.

RT error i.e. Predicted RT≠Actual RT: Run-time of a job is predicted using the historical behavior in the form of time-series data. Prediction of run-time can go wrong for the following reasons:

i. The data is too noisy or contains invalid records—In such cases, the system 100 recommends removing noise and invalid records from it.

ii. The data has few records or is too old—In such cases, the system 100 recommends adding more records that have been recently captured.

iii. Changing workload or anomalous execution for that particular day—These get taken care when the prediction adapt to these anomalies in real-time.

For example, in FIG. 4 node A2 caused all its children to start 2 hours later because firstly it started 1 hour later than expected and secondly it ran one hour longer than predicted.

Case Study and Result Discussion:

The system 100 implementing the method 200 was used for a large retailer with more than 200 stores across the country to provide batch prediction solution to transform their batch operations from reactive to proactive and accurately predict it ahead of time to ensure timely completion of business deliverables. The estate was a complex one with 20,000+ jobs and 30,000+ precedence relationships spread across 5 lines of businesses, that were responsible for carrying out diverse set of processes and deliverables such printing price tags, generating daily sales reports, planning promotions, processing store orders, etc. While deploying the solution in development environment, it was observed that large deviations between the actual and predicted behavior of a number of jobs. For a given day, it was found that out of 19 critical jobs, 12 jobs were observing prediction error between 60 minutes to 23 hours. Given the critical nature of these jobs, inaccurate prediction would have directly impacted business deliverables on a regular basis, since accurately capturing the potential SLA breaches and notifying the operations team about the same was challenging. The estate being a complex one with large number of jobs and complex interdependencies under consideration, diagnosing the problematic areas and identifying the origins of error would have been an extremely tedious process and prone to error. The system 100 implementing the method 200 was applied to diagnose the problematic areas, narrow down to the origin of error (localizing of jobs), generate actionable recommendations, and eventually apply them to get near perfect prediction at the zeroth hour of the day. The root cause analysis performed by the system 100 listed the top causes for these inaccuracies as (i) incorrect dependencies and missing dependencies leading to start-time inaccuracy, and (ii) incorrect run time predictions leading to run time inaccuracy. Listed below are some of the examples:

Example 1—SLA job XXXXCY007_XXXXCD007 observed a prediction error of 23 hours 40 minutes. While this job had a complex dependency with 264 jobs in its upstream, there were only 10 jobs that were observing prediction error, out of which only 3 were causing this error. Once the system 100 localized nodes or jobs indicating the origins of error and after drilling down further, it was identified that the inaccuracy was due to deviation in both start time and run time of the localized jobs.

(i) Deviation in predicted start-time was observed on 1 job: MXXXXXFL_PXXXXLA. On characterizing, it was that found that its predecessor job, which was a long running job, was scheduled to execute on that specific day, as per the definition, but it did not actually run, which led to inaccurate start-time computation of the localized job. As a corrective measure, the system 100 recommended to verify the schedules that were defined for the predecessor job. This was further validated by the domain SMEs who confirmed the discrepancy, post that the correct schedules were defined.

(ii) Deviation in predicted run-time was observed on 3 jobs: MXXXXXFL_PXXXXLA, MXXXXXFL_DXXXX1B, and MXXXXXFL_DXXXX1F which observed deviations of approximately 2 hours, 1 hour, and 35 minutes respectively between actual and predicted execution. On characterizing, it was found that the primary reasons for these were (a) presence of negative values in the historic data, (b) absence of recent historic runs, and (c) anomalous execution. As corrective measures, the system 100 recommended to remove the invalid records to model the behavior correctly and add recent records to consider the recent change in behavior and adapt accordingly. On implementing these recommendations of the system 100, the prediction accuracy improved significantly to an error margin of 14 minutes.

Example 2—SLA job XXXXMNT_XXXXXDME observed a prediction error of 9 hours and 4 minutes. This job had 49 jobs in its upstream, out of which 30 jobs were observing prediction error but only 1 was causing this error. Once the jobs were localized by the system 100 indicating the origin of error and further drilled down it was identified that the inaccuracy was due to deviation in the start-time of the localized job.

(i) Deviation in predicted start-time was observed on job: XXXXMNT_XXXXXDME. On characterizing, it was found that the localized job actually executed 19 hours earlier than the end time of its last predecessor job, with the start-time of localized job being 1:30 AM and the end time of predecessor being 8:05 PM. As a corrective measure, the solution recommended to verify the dependency definition between the localized job and its predecessor job since an ideal flow requires the completion of predecessor before the execution of its successor. This was validated by the domain SMEs who confirmed the discrepancy in the defined dependency, which primarily happened due to the similar names of different jobs. On implementing these recommendations, prediction accuracy improved significantly to an error margin of less than 12 minutes.

The derived insights were used, and the recommended corrective measures were applied, and after monitoring them for a period of 3 days, an improvement in the prediction accuracy from 40% to 92% with an error margin of less than 15 minutes was recorded. This not only ensured to improve the batch prediction accuracy, but also (i) saved efforts by identifying the discrepancies in the modelled blueprint and gaps in the data at the initial stage of deployment, and (ii) eased out the entire process of on boarding the solution end-to-end in a short span of time.

Thus, the method and system disclosed herein generate fix recommendation(s) that are derived by using finer knowledge of the batch process constructs and the causes obtained via root cause analysis. The approach applied by the method disclosed herein for generating fix recommendation reduces manual effort of operations team to undergo an overhaul of cleaning and correcting large volumes of datasets and provides pointed/focused recommendations to correct only a small subset of the batch. Such solutions significantly reduce manual and time effort and enable increased adoption of predictive solutions in batch operations teams.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:
    generating, by one or more hardware processors, a batch graph corresponding to a batch process from among a plurality of batch processes, wherein the batch graph represents complex inter-dependencies of a plurality of jobs in the batch process using a plurality of nodes depicting parent-child relationship among the plurality of nodes, and wherein the batch graph captures precedence, schedule, time triggers, a predicted start time, a predicted run time, a predicted end time, an actual start time, an actual run time, and an actual end time of each of the plurality of jobs;
    detecting, by the one or more hardware processors, presence of a Service Level Agreement (SLA) job in the plurality of jobs of the batch process represented by the batch graph, wherein the SLA job is identified as a child node;
    determining, by the one or more hardware processors, on detecting presence of the SLA job in the batch process, whether the detected SLA job has an end time inaccuracy, wherein the end time inaccuracy is computed from the predicted end time and the actual end time of the SLA job;
    applying, by the one or more hardware processors, an iterative bottom-up traversing approach on the batch graph from the child node representing the SLA job to detect one or more parent nodes among a plurality parent nodes of the child node at each successive level among a plurality of successive levels of the batch graph, wherein the detected one or more parent nodes at each successive level have a time deviation introducing an end time error due to difference between the actual end time and the predicted end time, and wherein the iterative bottom-up traversing approach terminates on detection at least one of, a) a parent node among the one or more parent nodes is a root node of the batch graph, and b) a job corresponding to a higher level parent node of the detected one or more parent nodes is having a zero time deviation;
    localizing, by the one or more hardware processors, one or more jobs associated with one or more nodes from among the one or more parent nodes at each successive level having the end time error greater than a maximum end time error aggregated for the one or more parent nodes at each successive level; and
    performing, by the one or more hardware processors, a root cause analysis of the localized one or more jobs for batch predictions by determining causes of the time deviation by classifying the localized one or more jobs based on a plurality of conditions further comprising a positive start time error, a negative start time error and a run time error, wherein the plurality of conditions are defined as a combination of at least one of the predicted start time, the predicted run time, the actual start time, and the actual run time, and wherein the root cause analysis identifies data inaccuracy and insufficiency in a dataset of the batch processing execution environment.

2. The method of claim 1, further comprising generating, by the one or more hardware processors, fix recommendations providing a list of plausible fixes for each of the localized one or more jobs based on the root cause analysis to eliminate the time deviation by fixing the data inaccuracy and insufficiency and enhancing the batch predictions for subsequent executions of the plurality of batch processes.

3. The method of claim 2, further comprising applying a multi objective optimization to determine intensity of impact of each plausible fix among the list of plausible fixes, wherein one or more high intensity fixes are applied for subsequent batch predictions.

4. A system comprising:
    a memory storing instructions;
    one or more Input/Output (I/O) interfaces; and
    one or more hardware processors coupled to the memory via the one or more I/O interfaces, wherein the one or more hardware processors are configured by the instructions to:
    generate a batch graph corresponding to a batch process from among a plurality of batch processes, wherein the batch graph represents complex inter-dependencies of a plurality of jobs in the batch process using a plurality of nodes depicting parent-child relationship among the plurality of nodes, and wherein the batch graph captures precedence, schedule, time triggers, a predicted start time, a predicted run time, a predicted end time, an actual start time, an actual run time, and an actual end time of each of the plurality of jobs;
    detect presence of a Service Level Agreement (SLA) job in the plurality of jobs of the batch process represented by the batch graph, wherein the SLA job is identified as a child node;
    determine, on detecting presence of the SLA job in the batch process, whether the detected SLA job has an end time inaccuracy, wherein the end time inaccuracy is computed from the predicted end time and the actual end time of the SLA job;
    apply an iterative bottom-up traversing approach on the batch graph from the child node representing the SLA job to detect one or more parent nodes among a plurality parent nodes of the child node at each successive level among a plurality of successive levels of the batch graph, wherein the detected one or more parent nodes at each successive level have a time deviation introducing an end time error as a result of difference between the actual end time and the predicted end time, and wherein the iterative bottom-up traversing approach terminates on detection at least one of, a) a parent node among the one or more parent nodes is a root node of the batch graph and b) a job corresponding to a higher level parent node of the detected one or more parent nodes is having a zero time deviation;
    localize one or more jobs associated with one or more nodes from among the one or more parent nodes at each successive level having the end time error greater than a maximum end time error aggregated for the one or more parent nodes at each successive level; and perform a root cause analysis of the localized one or more jobs for batch predictions by determining causes of the time deviation by classifying the localized one or more jobs based on a plurality of conditions further comprising a positive start time error, a negative start time error and a run time error, wherein the plurality of conditions are defined as a combination of at least one of the predicted start time, the predicted run time, the actual start time, and the actual run time, and wherein the root cause analysis identifies data inaccuracy and insufficiency in a dataset of the batch processing execution environment.

5. The system of claim 4, wherein the one or more hardware processors are further configured by the instructions to generate fix recommendations providing a list of plausible fixes for each of the localized one or more jobs based on the root cause analysis to eliminate the time deviation by fixing the data inaccuracy and insufficiency and enhancing the batch predictions for subsequent executions of the plurality of batch processes.

6. The system of claim 5, wherein the one or more hardware processors are further configured by the instructions to apply a multi objective optimization to determine intensity of impact of each plausible fix among the list of plausible fixes, wherein high intensity fixes are applied for subsequent batch predictions.

7. One or more non-transitory machine-readable information storage mediums comprising one or more instructions which when executed by one or more hardware processors cause:

generating a batch graph corresponding to a batch process from among a plurality of batch processes, wherein the batch graph represents complex inter-dependencies of a plurality of jobs in the batch process using a plurality of nodes depicting parent-child relationship among the plurality of nodes, and wherein the batch graph captures precedence, schedule, time triggers, a predicted start time, a predicted run time, a predicted end time, an actual start time, an actual run time, and an actual end time of each of the plurality of jobs;

detecting presence of a Service Level Agreement (SLA) job in the plurality of jobs of the batch process represented by the batch graph, wherein the SLA job is identified as a child node;

determining on detecting presence of the SLA job in the batch process, whether the detected SLA job has an end time inaccuracy, wherein the end time inaccuracy is computed from the predicted end time and the actual end time of the SLA job;

applying an iterative bottom-up traversing approach on the batch graph from the child node representing the SLA job to detect one or more parent nodes among a plurality parent nodes of the child node at each successive level among a plurality of successive levels of the batch graph, wherein the detected one or more parent nodes at each successive level have a time deviation introducing an end time error due to difference between the actual end time and the predicted end time, and wherein the iterative bottom-up traversing approach terminates on detection at least one of, a) a parent node among the one or more parent nodes is a root node of the batch graph, and b) a job corresponding to a higher level parent node of the detected one or more parent nodes is having a zero time deviation;

localizing one or more jobs associated with one or more nodes from among the one or more parent nodes at each successive level having the end time error greater than a maximum end time error aggregated for the one or more parent nodes at each successive level; and performing a root cause analysis of the localized one or more jobs for batch predictions by determining causes of the time deviation by classifying the localized one or more jobs based on a plurality of conditions further comprising a positive start time error, a negative start time error and a run time error, wherein the plurality of conditions are defined as a combination of at least one of the predicted start time, the predicted run time, the actual start time, and the actual run time, and wherein the root cause analysis identifies data inaccuracy and insufficiency in a dataset of the batch processing execution environment.

8. The one or more non-transitory machine-readable information storage mediums of claim 7, wherein the one or more instructions which when executed by the one or more hardware processors further cause generating fix recommendations providing a list of plausible fixes for each of the localized one or more jobs based on the root cause analysis to eliminate the time deviation by fixing the data inaccuracy and insufficiency and enhancing the batch predictions for subsequent executions of the plurality of batch processes.

9. The one or more non-transitory machine-readable information storage mediums of claim 8, wherein the one or more instructions which when executed by the one or more hardware processors further cause applying a multi objective optimization to determine intensity of impact of each plausible fix among the list of plausible fixes, wherein one or more high intensity fixes are applied for subsequent batch predictions.

* * * * *